Figure 1:
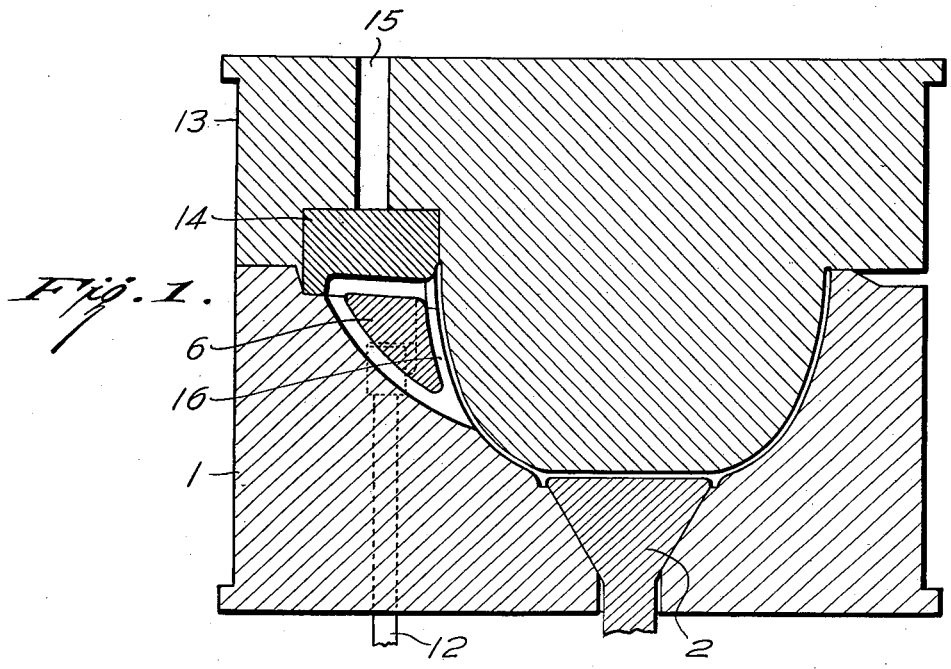

Dec. 8, 1936.  J. G. WHEWAY  2,063,355

PROCESS AND MOLD FOR MOLDING PLASTIC COMPOSITIONS

Filed Oct. 17, 1932   2 Sheets-Sheet 1

INVENTOR.
JAMES G. WHEWAY,
BY
ATTORNEY.

Dec. 8, 1936. J. G. WHEWAY 2,063,355
PROCESS AND MOLD FOR MOLDING PLASTIC COMPOSITIONS
Filed Oct. 17, 1932   2 Sheets-Sheet 2
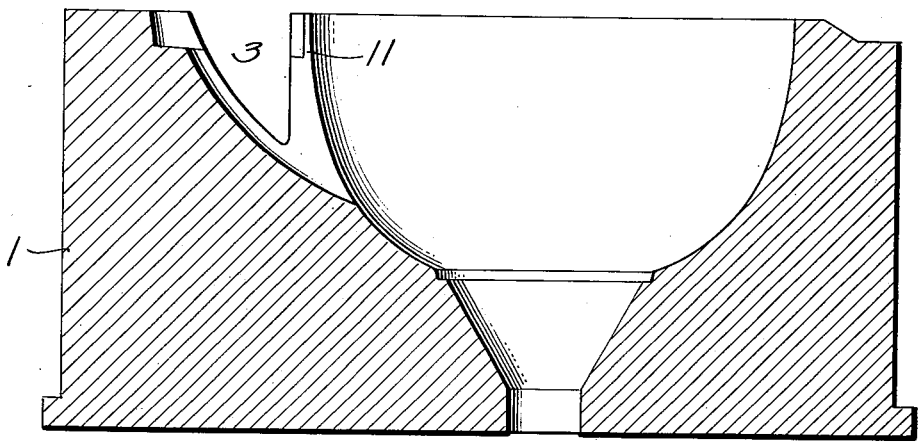
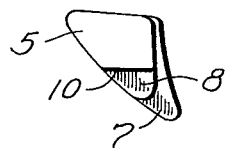
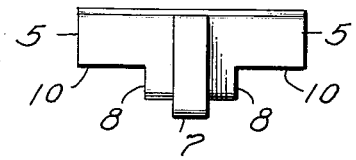
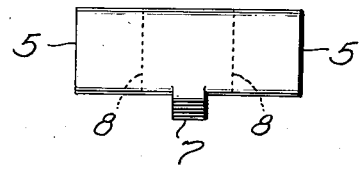
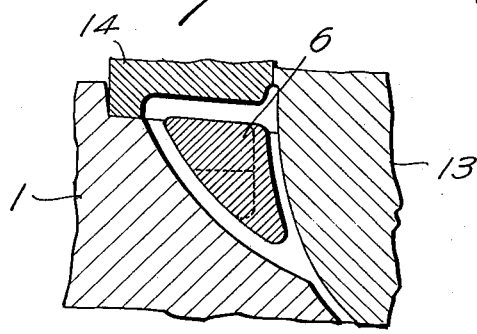
INVENTOR.
JAMES G. WHEWAY,
BY
ATTORNEY.

Patented Dec. 8, 1936

2,063,355

UNITED STATES PATENT OFFICE 2,063,355

PROCESS AND MOLD FOR MOLDING PLASTIC COMPOSITIONS

James George Wheway, Streetly, England, assignor, by mesne assignments, to American Cyanamid Company, a corporation of Maine Application October 17, 1932, Serial No. 638,072
In Great Britain October 30, 1931

9 Claims. (Cl. 25—129)

This invention relates to the molding of plastic compositions, especially molding powders of a synthetic resin composition, and its objects are the production in a simpler and more efficient manner than heretofore of molded articles (e. g. cups, jugs and the like) having cored projecting parts such as handles and the increasing of the range of design of those parts.

In the manufacture of articles of this nature the use of a "split-mold" (a mold or die in two parts, divided along the line of pressure, to enable the molded article to be removed) does not give satisfactory results for various reasons. For instance, the joint of the two molds invariably causes a ridge on the finished article and further, the strains set up in the finished article when it is subjected to sudden or extreme changes in temperature tend to cause the article to crack along the line where the two parts of the die or mold meet.

To obviate the use of a split-mold in the production of articles such as cups, which, if it were not for the handle, would present little difficulty in molding from an unsplit mold, it is proposed to form the outer die of the mold of one piece and to use a detachable coring pin for the hole in the handle, this coring pin being removed laterally from the mold after the molding operation and after the ejection of the article.

According to a preferred form of the present invention the mold for articles of the type referred to comprises a die shaped to form the outside of the article, an inner plunger and a coring pin for the projecting part adapted to be removed from the die with the article. The outer die usually forms the outside of the handle or the like including its two sides and the coring pin fits into a locating recess in the die.

An important object of the invention is achieved by providing a specially formed recess in the outer die by means of which the article may be ejected with the core-piece in situ in the handle or the like, the core-piece being subsequently removed from the handle.

The accompanying drawings illustrate the construction of molds in accordance with the invention. In the drawings—

Figure 2:
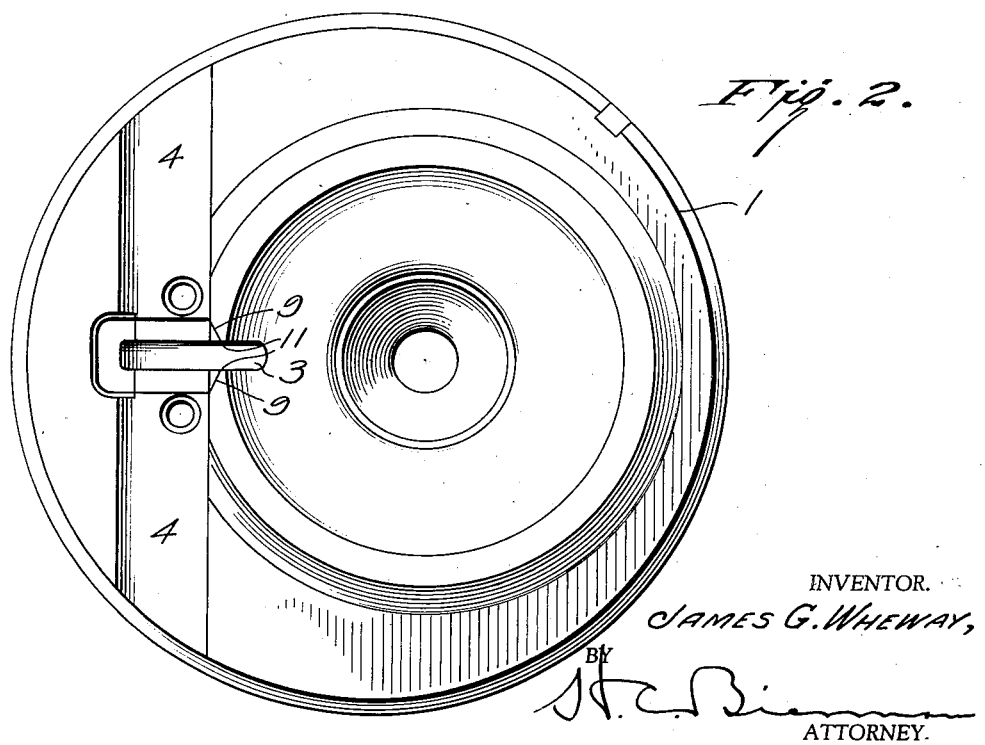

Fig. 1 is a longitudinal section of a mold with the plunger and other cooperating parts in position, Fig. 2 is a plan of the outer die alone, Fig. 3 is a longitudinal section of the same, Figs. 4, 5 and 6 are side elevation, front elevation and plan respectively of the handle coring pin, Fig. 7 is a part longitudinal section of a mold showing a modification.

Referring to Figs. 1 to 3, the outer die 1 is shaped to the form of the outside of the article, in this case a cup, from the top rim to the bottom edge and is in one piece. The bottom of the die is formed as an ejector plunger 2 which is, in effect, integral with the outer die 1 during the pressing process. The outer die 1 is provided with a recess 3 shaped to form the outside of the handle and with laterally extending grooves 4 which fit corresponding extensions 5 of the coring pin 6 shown separately in Figs. 4 to 6 and shaped at the center part 7 to form the inside of the handle.

The sides of the grooves 4 towards the body of the cup are made vertical so that the coring pin may be ejected with the cup after molding. The opposite sides of the grooves present no difficulty in ejection on account of the direction of their slope. These surfaces ensure correct location of the coring pin 6 in a vertical direction and in a horizontal direction towards and away from the center of the cup. The coring pin 6 is located in a horizontal direction at right angles to the handles by the center part 7 engaging the recess 3.

The coring pin 6 is also provided with shoulders 8 and horizontal surfaces 10 which engage with the bottoms of grooves 4. Auxiliary plungers 12 are disposed in outer die 1 and cooperate with the surfaces 10 for ejection; and these plungers are moved at the requisite time synchronously with the plunger 2, or the outer die may be lowered while the plungers are held stationary. It is possible in some cases to dispense with the plunger 2.

It will be understood that in certain cases, such as the molding of articles whose sides are vertical or diverge from the top, e. g. tankards, we may form the whole of the corepiece of uniform cross-section.

The interior of the cup and its rim and the top of the handle are formed by means of a plunger die 13 in the usual way. For convenience in manufacture the part 14 which forms the top of the handle is made separately from the remainder of the plunger die and is a driving fit therein. Holes 15 are provided to facilitate removal when required.

In a mold using a side-withdrawn coring pin it is obvious that at the junction of the hole in the mold for the coring pin and the cavity at right angles thereto giving the shape at the sides and bottom to the handle there must be an appreciable thickness of metal between the hole for the core and the cavity in the mold forming the body of the cup to obviate the formation of a vulnerable knife-edge on the die. In other words the coring pin must be some little distance away from the surface of the article and this causes a thickened part on the molded article leading from the top to the bottom of the handle.

In the preferred form of the invention described above a thickened part 16 of the cup is deliberately formed at this part but it will be understood that as shown in Fig. 7 the center part 7 of the coring pin 6 may be extended into contact with the side of the cup to produce articles without this thickened part and thus the range of design of handles is increased.

It should be stated however, that with the new form of mold a knife-edge could be produced by wrong assembly of the mold parts. This drawback is obviated as shown in Fig. 2 by making some of the engaging surfaces interfitting, for example the contacting surfaces 9 of the outer die with the part 14 oblique and slightly truncating the edge 11 of the die.

The molded articles may be ejected by any known means, but the arrangement described above has been found very convenient.

Having now particularly described and ascertained the nature of the said invention and in what manner the same is to be performed, what is claimed is:—

1. A mold for the production from plastic compositions of articles having handles or like projecting parts comprising an outer die, an inner plunger and a coring pin for the projecting part adapted to be removed from the die with the article.

2. A mold for the production from plastic compositions of articles having handles or like projecting parts comprising an outer die shaped to form the outside of the article and the outside of the handle or the like including its two sides and a coring pin shaped to form the inside of the handle or the like, in which the coring pin fits into a locating recess in the outer die from which it is adapted to be removed with the article.

3. A mold as claimed in claim 2 in which the part of the coring pin adapted to form the inside of the handle or the like projects beyond the parts immediately adjacent thereto.

4. A mold as claimed in claim 1, in which the coring pin has side faces adapted to register with corresponding faces of a recess in the outer die to ensure correct location in molding and ejecting.

5. A mold as claimed in claim 1, in which the coring pin has a stepped portion to provide a horizontal surface and an ejection pin engaging said surface.

6. A mold as claimed in claim 1, with ejecting means for the body of the article and the coring pin.

7. A mold for the production from plastic compositions of articles having apertured handles or like projecting parts comprising an outer die, an inner plunger die, and a separate coring pin for the projecting handle or other part and adapted to be removed from the die with the molded article.

8. A mold for the production from plastic compositions of articles having apertured handles or like projecting parts comprising an outer die, an inner plunger die, and a separate coring pin for the projecting handle or other part and adapted to be removed from the die with the molded article and laterally removed from the article.

9. The process of heat and pressure molding an article such as cup, jug, or the like having an apertured handle-like protuberance which comprises flowing a mastic composition in a mold and around a removable coring pin to shape the article, separating the article and coring pin as a unit from the mold and removing the coring pin from the thus formed aperture in the handle.

JAMES GEORGE WHEWAY.